(12) United States Patent
Wang et al.

(10) Patent No.: US 8,553,799 B2
(45) Date of Patent: Oct. 8, 2013

(54) METHOD AND APPARATUS FOR OBTAINING PRECODING MATRIX INDICATOR

(75) Inventors: Jianguo Wang, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/434,540

(22) Filed: Mar. 29, 2012

(65) Prior Publication Data

US 2012/0189075 A1    Jul. 26, 2012

Related U.S. Application Data

(63) Continuation of application No. PCT/CN2010/077545, filed on Sep. 30, 2010.

(30) Foreign Application Priority Data

Sep. 30, 2009    (CN) .......................... 2009 1 0235286

(51) Int. Cl.
*H04B 7/02* (2006.01)

(52) U.S. Cl.
USPC .......... 375/267; 370/344; 381/94.3; 375/260; 375/262; 455/69

(58) Field of Classification Search
None
See application file for complete search history.

(56) References Cited

U.S. PATENT DOCUMENTS

| | | | |
|---|---|---|---|
| 2006/0039489 A1* | 2/2006 | Ikram et al. .................. | 375/260 |
| 2007/0195974 A1 | 8/2007 | Li et al. | |
| 2008/0049709 A1 | 2/2008 | Pan et al. | |
| 2008/0192853 A1 | 8/2008 | Kent et al. | |
| 2008/0232501 A1 | 9/2008 | Khojastepour et al. | |
| 2009/0017769 A1 | 1/2009 | Chen et al. | |
| 2010/0266061 A1 | 10/2010 | Cheng et al. | |

FOREIGN PATENT DOCUMENTS

| CN | 101036332 A | 9/2007 |
|---|---|---|
| CN | 101146078 A | 3/2008 |
| CN | 101262456 A | 9/2008 |
| CN | 101340219 A | 1/2009 |
| CN | 101400074 A | 4/2009 |
| CN | 101471907 A | 7/2009 |

(Continued)

OTHER PUBLICATIONS

Office Action issued in corresponding Chinese Patent Application No. 200910235286.0, mailed Aug. 17, 2012.

(Continued)

*Primary Examiner* — Adolf Dsouza
(74) *Attorney, Agent, or Firm* — Brinks Hofer Gilson & Lione

(57) ABSTRACT

A method and an apparatus for obtaining a precoding matrix indicator is disclosed, which relates to the field of communication technologies. The method includes: obtaining a first rotation matrix according to first channel information; obtaining a first differential matrix according to the first rotation matrix and a currently-obtained instantaneous beam forming matrix/precoding matrix; and quantizing, according to a first differential codebook, a pre-acquired first rank indicator, and preset quantization criteria, the first differential matrix to obtain a differential precoding matrix indicator. The apparatus includes: a first rotation matrix obtaining module, a first differential matrix obtaining module, and a differential precoding matrix indicator obtaining module. The differential PMI is obtained according to the channel information, and the differential PMI is used for feedback.

10 Claims, 8 Drawing Sheets

(56) References Cited

FOREIGN PATENT DOCUMENTS

| CN | 101512929 A | 8/2009 |
|---|---|---|
| CN | 101931440 A | 12/2010 |
| EP | 2445288 A1 | 4/2012 |
| WO | WO 2007/092539 A2 | 8/2007 |
| WO | WO 2008/054737 A2 | 5/2008 |
| WO | WO 2008/138165 A1 | 11/2008 |
| WO | WO 2009/003423 A1 | 1/2009 |

OTHER PUBLICATIONS

International Search Report and Written Opinion of the International Searching Authority issued in corresponding PCT Patent Application No. PCT/CN2010/077545, mailed Jan. 6, 2011.

Li et al., "A Low Feedback Scheme for WMAN MIMO Beamforming" WE4C-3, IEEE 2007.

InterDigital Communications Corporation, "Uplink MIMO Precoding Using Differential Feedback", Agenda Item 8.5, 3GPP TSG RAN WG1 #46. Tallinn, Estonia, Aug. 28-Sep. 1, 2006. R1-062160.

Broadcom Corp et al., "Consideration of Differential Feedback for SU-MIMO" Agenda Item 7.10, 3GPP TSG-RAN WG1 RAN49. Kobe, Japan, May 7-11, 2007. R1-072403.

Nortel, "Further Discussion on the Differential Feedback of PMI for LTE Downlink Closed-Loop MIMO" Agenda Item 7.2.4, 3GPP TSG-RAN Working Group 1 Meeting #50. Athens, Greece, Aug. 20-24, 2007. R1-073292.

InterDigital Communications LLC, "Binary Differential Feedback Using Existing Codebooks for E-UTRA" Agenda Item 6.4.5, 3GPP TSG RAN WG1 Meeting #51. Jeju, Korea, Nov. 5-9, 2007. R1-074706.

Extended European Search Report issued in corresponding European Patent Application No. 10819926.6, mailed Jun. 28, 2012.

\* cited by examiner

METHOD AND APPARATUS FOR OBTAINING PRECODING MATRIX INDICATOR

CROSS-REFERENCE TO RELATED APPLICATIONS

This application is a continuation of International Application No. PCT/CN2010/077545, filed on Sep. 30, 2010, which claims priority to Chinese Patent Application No. 200910235286.0, filed on Sep. 30, 2009, both of which are hereby incorporated by reference in their entireties.

FIELD OF THE INVENTION

The present disclosure relates to the field of communication technologies, and in particular, to a method and an apparatus for obtaining a precoding matrix indicator.

BACKGROUND OF THE INVENTION

With the continuous development of communication technologies, in a MIMO (Multiple Input Multiple Output, multiple input multiple output) wireless system, a data sender (such as an eNode B (evolved Node B, evolved Node B)) may obtain a BF (Beam Forming, beam forming) matrix/precoding matrix according to a pre-acquired RI (Rank Indicator, rank indicator) and a PMI (Precoding Matrix Indicator, precoding matrix indicator) fed back by a data receiver (such as a UE (User Equipment, user equipment)), then use the BF matrix/precoding matrix to preprocess the data to be sent, and send the preprocessed data to the data receiver through multiple antennas. In this way, a data sending process may adapt itself to changes of a channel status, and performance of data transmission is improved. Therefore, how to obtain the PMI and performance of the obtained PMI are crucial.

Currently, in a 3GPP LTE R8 (3rd Generation Partnership Project Long Term Evolution Release 8, 3rd Generation Partnership Project Long Term Evolution Release 8) system, the data receiver obtains a PMI based on a fixed version and feeds back the PMI to the data sender.

However, in the process of implementing the present disclosure, the inventor finds at least the following problems in the prior art:

The existing 3GPP LTE R8 system is primarily designed for SU-MIMO (Single User MIMO, single-user MIMO) and employs a fixed codebook, and the fed back PMI has low accuracy.

SUMMARY OF THE INVENTION

To improve accuracy of feedback during feeding back a PMI, embodiments of the present disclosure provide a method and an apparatus for obtaining a precoding matrix indicator. The technical solutions are as follows:

According to one aspect, an embodiment of the present disclosure provides a method for obtaining a precoding matrix indicator. The method includes:

obtaining a first rotation matrix according to first channel information;

obtaining a first differential matrix according to the first rotation matrix and a currently-obtained instantaneous beam forming matrix/precoding matrix; and quantizing, according to a first differential codebook, a pre-acquired first rank indicator, and preset quantization criteria, the first differential matrix to obtain a differential precoding matrix indicator.

According to another aspect, an embodiment of the present disclosure provides an apparatus for obtaining a precoding matrix indicator. The apparatus includes:

a first rotation matrix obtaining module, configured to obtain a first rotation matrix according to first channel information;

a first differential matrix obtaining module, configured to obtain a first differential matrix according to the first rotation matrix and a currently-obtained instantaneous beam forming matrix/precoding matrix after the first rotation matrix obtaining module obtains the first rotation matrix; and a differential precoding matrix indicator obtaining module, configured to quantize, according to a first differential codebook, a pre-acquired first rank indicator, and preset quantization criteria, the first differential matrix to obtain a differential precoding matrix indicator after the first differential matrix obtaining module obtains the differential matrix.

According to another aspect, an embodiment of the present disclosure provides a data sending apparatus. The apparatus includes:

a second rotation matrix obtaining module, configured to obtain a second rotation matrix according to second channel information;

a second differential matrix obtaining module, configured to: obtain a second differential matrix according to a received differential precoding matrix indicator and by using a second differential codebook and a pre-acquired second rank indicator, where the differential precoding matrix indicator is obtained by a data receiving apparatus according to a first rotation matrix and an instantaneous beam forming matrix/precoding matrix, which are obtained by the data receiving apparatus, and by using a first differential codebook and a pre-acquired first rank indicator, the first rotation matrix is obtained according to a first channel message, the second channel information is consistent with the first channel information, and the second differential codebook and the second rank indicator are consistent with the first differential codebook and the first rank indicator respectively; and a precoding matrix reconstructing module, configured to reconstruct the beam forming matrix/precoding matrix according to the second rotation matrix obtained by the second rotation matrix obtaining module and the differential matrix obtained by the second differential matrix obtaining module.

According to another aspect, an embodiment of the present disclosure provides a method for reconstructing a beam forming matrix/precoding matrix. The method includes:

obtaining a second rotation matrix according to second channel information;

obtaining a second differential matrix according to a received differential precoding matrix indicator and by using a second differential codebook and a pre-acquired second rank indicator, where the differential precoding matrix indicator is obtained by a data receiving apparatus according to a first rotation matrix and an instantaneous beam forming matrix/precoding matrix, which are obtained by the data receiving apparatus, and by using a first differential codebook and a pre-acquired first rank indicator, the first rotation matrix is obtained according to a first channel message, the second channel information is consistent with the first channel information, and the second differential codebook and the second rank indicator are consistent with the first differential codebook and the first rank indicator respectively; and reconstructing the beam forming matrix/precoding matrix according to the second rotation matrix and the second differential matrix.

Beneficial effects of the technical solutions according to the embodiments of the present disclosure are:

The differential PMI is obtained according to the channel information, the differential PMI is used for feedback, and the information that already exists in the channel may be used, which not only reduces an overhead, but also makes full use of a correlation of a channel between a frequency domain and a time domain, thus improving the feedback accuracy.

DETAILED DESCRIPTION OF THE EMBODIMENTS

To make the objectives, technical solution and merits of the present disclosure clearer, the following further describes the embodiments of the present disclosure in detail with reference to the accompanying drawings.

Embodiment 1

Figure 1:
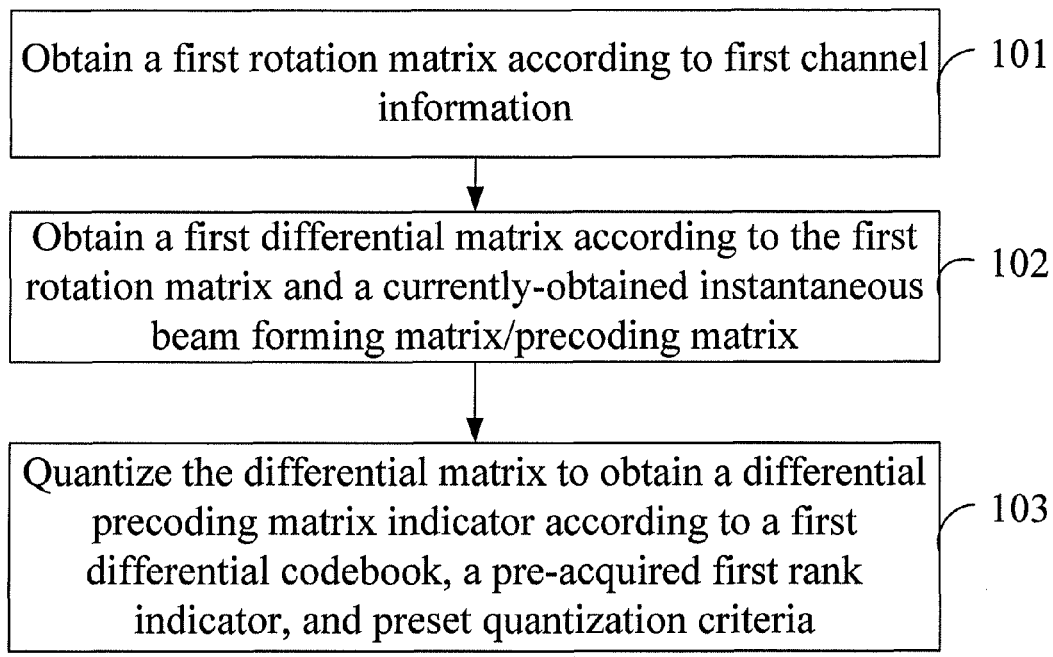
FIG. 1 is a flowchart of a method for obtaining a precoding matrix indicator according to a first embodiment of the present disclosure.

An embodiment of the present disclosure provides a method for obtaining a precoding matrix indicator. As shown in FIG. 1, the method includes:

101. Obtain a first rotation matrix according to first channel information.

102. Obtain a first differential matrix according to the first rotation matrix and a currently-obtained instantaneous beam forming matrix/precoding matrix.

103. Quantize, according to a first differential codebook, a pre-acquired first rank indicator, and preset quantization criteria, the first differential matrix to obtain a differential precoding matrix indicator.

When the first channel information is a first long-term channel covariance matrix, the obtaining the first rotation matrix according to the first channel information may include:

performing eigenvalue decomposition on the first long-term channel covariance matrix to obtain an eigen matrix of the first long-term channel covariance matrix, where the first long-term channel covariance matrix is obtained by averaging multiple channel matrixes obtained locally on a single or multiple subcarriers in a preset time period; and using the eigen matrix of the first long-term channel covariance matrix as the first rotation matrix.

When the first channel information is a reference precoding matrix indicator, the obtaining the first rotation matrix according to the first channel information may include:

if the reference precoding matrix indicator is orthogonal to columns of the precoding matrix corresponding to the pre-acquired first rank indicator and the rank is full, normalizing respective columns of the precoding matrix and using a normalized precoding matrix as the first rotation matrix; and if the reference precoding matrix indicator is orthogonal to columns of the precoding matrix corresponding to the pre-acquired first rank indicator and the rank is not full, but a codebook corresponding to the reference precoding matrix indicator meets nesting characteristics, selecting a full-rank precoding matrix corresponding to the reference precoding matrix indicator, normalizing respective columns of the full-rank precoding matrix, and using a normalized full-rank precoding matrix as the first rotation matrix.

When the first channel information is a reference precoding matrix indicator, the obtaining the first rotation matrix according to the first channel information may include:

normalizing respective columns of precoding matrixes corresponding to the reference precoding matrix indicator and the pre-acquired first rank indicator; and performing QR (quadrature right-triangle) decomposition for a normalized precoding matrix to obtain the first rotation matrix.

When a local system has N dual-polarization transmitting antennas, the first differential codebook is a differential dual-polarization codebook. The differential dual-polarization codebook is obtained according to a single-polarization differential codebook that includes $2^L$ codewords. The differential dual-polarization codeword includes $2^{L+1}$ codewords. In the differential dual-polarization codeword, $2^L$ codewords are the same as those in the differential single-polarization codebook. Other $2^L$ codewords are obtained by left-multiplying each codeword in the differential single-polarization codebook by a preset diagonal matrix, where N is an even number greater than or equal to 2, and L represents the number of information bits occupied by feedback of a codeword in the differential single-polarization codebook.

Further, when both a power-restricted differential codebook and a power-unrestricted differential codebook exist locally, the method further includes:

from the power-restricted differential codebook and the power-unrestricted differential codebook, selecting one codebook as the first differential codebook according to local power headroom and a preset power headroom threshold value.

Further, after the differential precoding matrix indicator is obtained, the method further includes:

feeding back the differential precoding matrix indicator to a data sender, so that the data sender reconstructs a beam forming matrix/precoding matrix according to the differential precoding matrix indicator and an obtained second rotation matrix and by using the second differential codebook and the pre-acquired second rank indicator, where the second rotation matrix is obtained by the data sender according to the second channel information, and the second channel information, the second rotation matrix, the second differential codebook, and the second rank indicator are consistent with the first channel information, the first rotation matrix, the first differential codebook, and the first rank indicator respectively. For example, a data receiver may feed back the first channel information, the first rotation matrix, the first differential codebook, or the first rank indicator to the data sender, and the data sender uses the foregoing received feedback information as the second channel information, the second rotation matrix, the second differential codebook, or the second rank indicator respectively, and therefore, the second channel information, the second rotation matrix, the second differential codebook, and the second rank indicator are consistent with the first channel information, the first rotation matrix, the first differential codebook, and the first rank indicator respectively; and/or the data sender may feed back the second channel information, the second rotation matrix, the second differential codebook, or the second rank indicator to the data receiver, and the data receiver uses the foregoing received feedback information as the second channel information, the second rotation matrix, the second differential codebook, or the second rank indicator respectively, and therefore, the second channel information, the second rotation matrix, the second differential codebook, and the second rank indicator are consistent with the first channel information, the first rotation matrix, the first differential codebook, and the first rank indicator respectively; and/or through presetting of the second channel information, the second rotation matrix, the second differential codebook, or the second rank indicator, and the first channel information, the first rotation matrix, the first differential codebook, or the first rank indicator at the data receiver and the data sender, the second channel information, the second rotation matrix, the second differential codebook, and the second rank indicator are consistent with the first channel information, the first rotation matrix, the first differential codebook, and the first rank indicator respectively.

The reconstructing, by the data sender, the beam forming matrix/precoding matrix according to the differential precoding matrix indicator and the obtained second rotation matrix and by using the second differential codebook and the pre-acquired second rank indicator may include:

obtaining the second rotation matrix according to the second channel information;

receiving the differential precoding matrix indicator, and using the second differential codebook and the pre-acquired second rank indicator to obtain the second differential matrix; and reconstructing the beam forming matrix/precoding matrix according to the second differential matrix and the second rotation matrix.

When the second channel information is a second long-term channel covariance matrix, the obtaining the second rotation matrix according to the second channel information may include:

performing eigenvalue decomposition on the second long-term channel covariance matrix to obtain an eigen matrix of the second long-term channel covariance matrix, where the second long-term channel covariance matrix is obtained by averaging multiple channel matrixes obtained locally on a single or multiple subcarriers in a preset time period; and using the eigen matrix of the second long-term channel covariance matrix as the second rotation matrix.

When the second channel information is a reference precoding matrix indicator, the obtaining the second rotation matrix according to the second channel information may include:

if the reference precoding matrix indicator is orthogonal to columns of the precoding matrix corresponding to the pre-acquired second rank indicator and the rank is full, normalizing respective columns of the precoding matrix and using a normalized precoding matrix as the second rotation matrix; and if the reference precoding matrix indicator is orthogonal to columns of the precoding matrix corresponding to the pre-acquired second rank indicator and the rank is not full, but a codebook corresponding to the reference precoding matrix indicator meets nesting characteristics, selecting a full-rank precoding matrix corresponding to the reference precoding matrix indicator, normalizing respective columns of the full-rank precoding matrix, and using a normalized full-rank precoding matrix as the second rotation matrix.

When the second channel information is a reference precoding matrix indicator, the obtaining the second rotation matrix according to the second channel information may include:

normalizing respective columns of precoding matrixes corresponding to the reference precoding matrix indicator and the pre-acquired second rank indicator; and performing QR (quadrature right-triangle) decomposition for a normalized precoding matrix to obtain the second rotation matrix.

Further, before the obtaining the first rotation matrix according to the first channel information, the method further includes:

obtaining a message of using a differential precoding matrix indicator or a non-differential precoding matrix indicator for feedback;

performing the step of obtaining the first rotation matrix according to the first channel information when obtaining the message of using the differential precoding matrix indicator for feedback; and using a first non-differential codebook and a pre-acquired third rank indicator to obtain a non-differential precoding matrix indicator according to the currently-obtained instantaneous beam forming matrix/precoding matrix when obtaining the message of using the non-differential precoding matrix indicator for feedback.

When the local system has N dual-polarization transmitting antennas, the first non-differential codebook is a dual-polarization non-differential codebook. The dual-polarization non-differential codebook is obtained according to a single-polarization non-differential codebook that includes $2^L$ codewords. The non-differential dual-polarization codeword includes $2^{L+1}$ codewords. In the non-differential dual-polarization codeword, $2^L$ codewords are the same as those in the non-differential single-polarization codebook. Other $2^L$ codewords are obtained by left-multiplying each codeword in the non-differential single-polarization codebook by a preset diagonal matrix, where N is an even number greater than or equal to 2, and L represents the number of information bits occupied by feedback of a codeword in the non-differential single-polarization codebook.

Further, when both a power-restricted non-differential codebook and a power-unrestricted non-differential codebook exist locally, the method further includes:

from the power-restricted non-differential codebook and the power-unrestricted non-differential codebook, selecting one codebook as the first non-differential codebook according to local power headroom and a preset power headroom threshold value.

In the method for obtaining a precoding matrix indicator in the embodiment of the present disclosure, the differential PMI is obtained according to the channel information, the differential PMI is used for feedback, and the information that already exists in the channel may be used, which not only reduces an overhead, but also makes full use of a correlation of a channel between a frequency domain and a time domain, thus improving the feedback accuracy, and fulfilling requirements of technologies such as MU-MIMO (Multiple User MIMO, multiple user MIMO) or CoMP (Coordinated Multiple Point transmission, coordinated multiple point transmission).

Embodiment 2

Figure 2A:
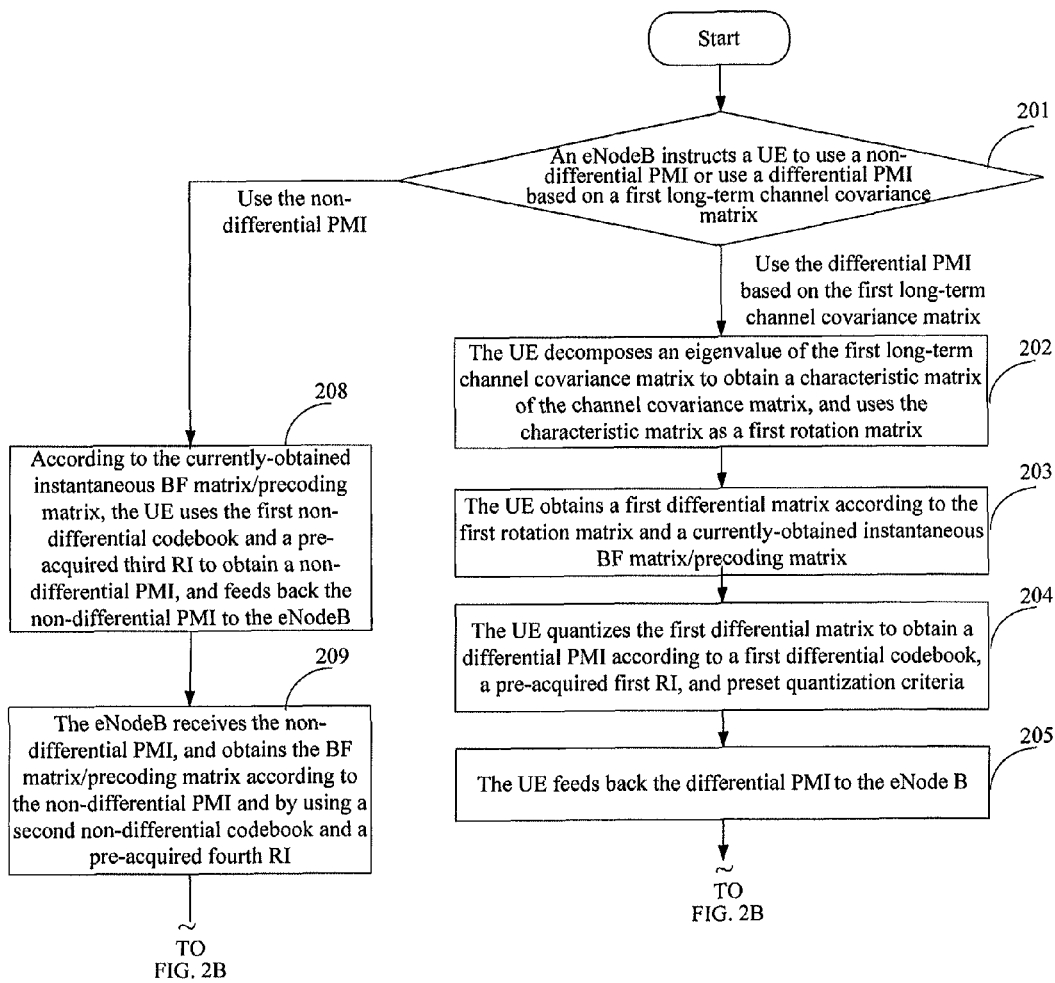
FIGS. 2a and 2b is a flowchart of a method for obtaining a precoding matrix indicator according to a second embodiment of the present disclosure.
Figure 2B:
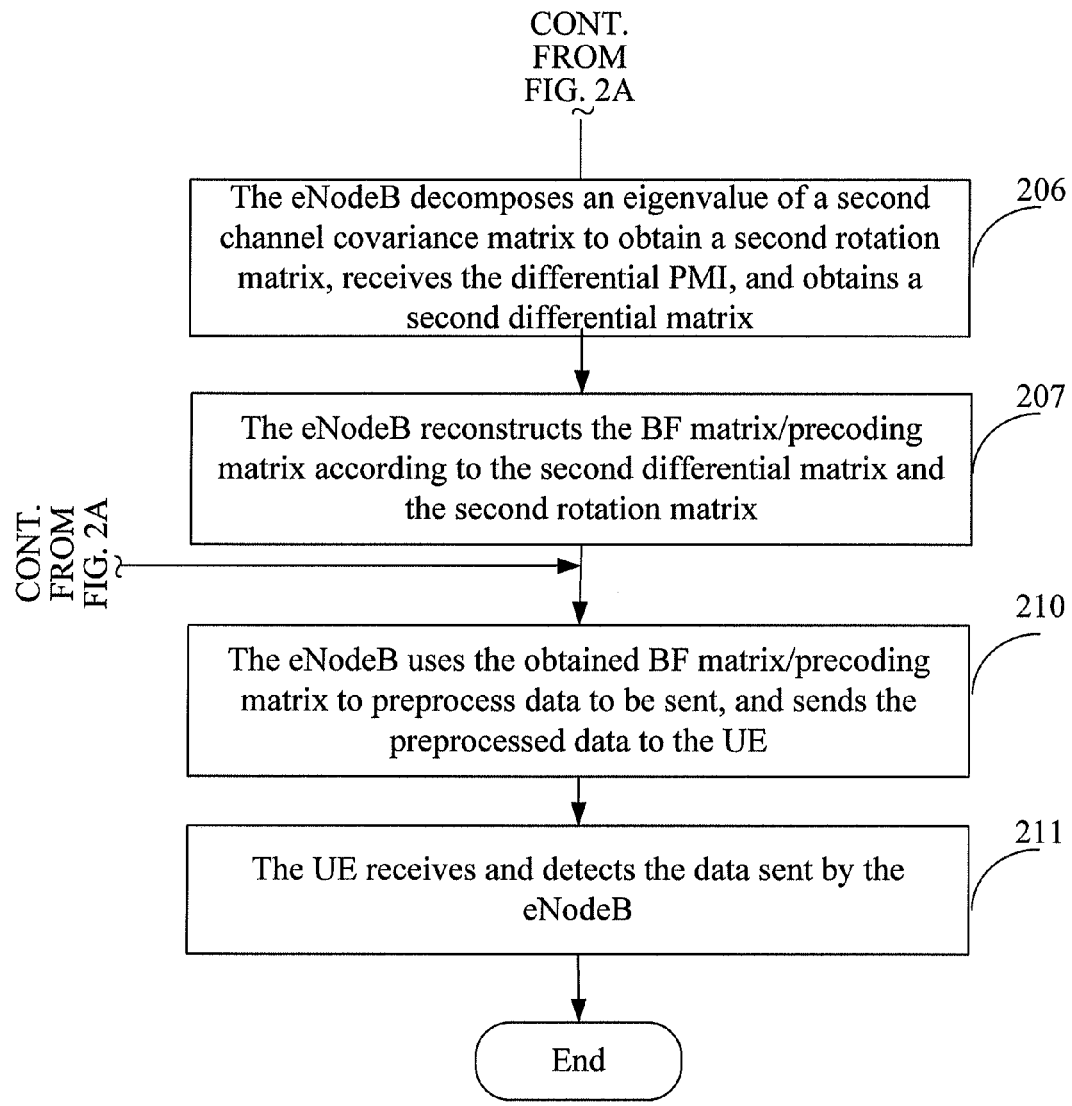

An embodiment of the present disclosure provides a method for obtaining a precoding matrix indicator. The method performs feedback by using a differential PMI based on a long-term channel covariance matrix. The following takes the downlink (namely, an eNode B sends data to a UE, and the UE feeds back a precoding matrix indicator to the eNode B) as an example for description. As shown in FIG. 2, the method includes:

201. An eNode B instructs a UE to use a non-differential PMI or a differential PMI based on a first long-term channel covariance matrix $R_{UE}$ for feedback. If the eNode B instructs the UE to use the non-differential PMI for feedback, step 208 is executed; if the eNode B instructs the UE to use the differential PMI based on the first long-term channel covariance matrix $R_{UE}$ for feedback, step 202 is executed.

For example, the eNode B may instruct the UE through high-layer signaling or a downlink physical control channel. Moreover, different identifiers may be used to differentiate whether to use the non-differential PMI or the differential PMI based on the first long-term channel covariance matrix $R_{UE}$. For example, 0 may be used to indicate it is instructed to use the non-differential PMI, and 1 may be used to indicate it is instructed to use the differential PMI based on the first long-term channel covariance matrix $R_{UE}$. The setting is not limited to this manner, and may be determined flexibly according to an actual application condition. Moreover, according to data to be sent and a channel status, whether to use the non-differential PMI for feedback, or use the differential PMI based on the first long-term channel covariance matrix $R_{UE}$ for feedback, or use a combination of the two may be chosen.

The first long-term channel covariance matrix $R_{UE}$ is obtained by the UE through averaging multiple channel matrixes obtained by the UE on a single or multiple subcarriers in a preset time period. The preset time period may be set according to the actual application condition, for example, may be set to 1 second, or 2 seconds. In the embodiment of the present disclosure, the first long-term channel covariance matrix $R_{UE}$ is obtained by averaging through the formula (1):

$$R_{UE} = \sum_i \alpha_i H_i^H H_i \quad (1)$$

In the foregoing formula, $H_i$ represents a channel matrix that is obtained in the preset time period and exists on a subcarrier i in different timeslots or sub-bands, and $\alpha_i$ is a weighting coefficient of $H_i$ and is used for smooth averaging and normalizing. Moreover, it should be noted that, the first long-term channel covariance matrix $R_{UE}$ is not necessarily obtained through the formula (1).

202. The UE performs eigenvalue decomposition on the first long-term channel covariance matrix $R_{UE}$ to obtain an eigen matrix $U_{UE}$ of the first long-term channel covariance matrix $R_{UE}$, and uses the characteristic eigen matrix $U_{UE}$ as a first rotation matrix.

For example, the performing eigenvalue decomposition on the first long-term channel covariance matrix $R_{UE}$ is as shown in the formula (2):

$$R_{UE} = U_{UE} \Sigma_{UE} U_{UE}^H \quad (2)$$

$\Sigma_{UE}$ represents a diagonal matrix constructed by using the eigenvalue of $R_{UE}$ as a diagonal element; $U_{UE}$ represents a matrix constructed by using all eigenvectors of the first long-term channel covariance matrix $R_{UE}$ as columns. For ease of description, $U_{UE}$ is called the eigen matrix of the first long-term channel covariance matrix $R_{UE}$.

203. The UE obtains a first differential matrix D according to the first rotation matrix $U_{UE}$ and a currently-obtained instantaneous BF matrix/precoding matrix V.

For example, according to the formula (3), the first differential matrix D is obtained as:

$$D = U_{UE}^H V \quad (3)$$

In the foregoing formula, V represents the currently-obtained instantaneous BF matrix/precoding matrix. V is an ideal BF matrix/precoding matrix that may reflect the channel status of the UE, and may be obtained according to the channel status of the UE. For example, V may be obtained by decomposing a singular value of an instantaneous channel matrix of the UE, or may be obtained through other various methods in the prior art, and details are not further described here.

204. The UE quantizes the first differential matrix D to obtain a differential precoding matrix $\hat{D}$ according to a first differential codebook, a pre-acquired first RI, and preset quantization criteria.

The first RI may be pre-acquired in various modes in the prior art, and details are not further described here.

For example, the quantizing the first differential matrix D to obtain $\hat{D}$ according to the first differential codebook, the pre-acquired first RI, and the quantization criteria shown in the formula (4) is:

$$\hat{D} = \underset{D_i \in C_d}{\operatorname{argmax}} \| D^H D_i \|_F \quad (4)$$

In the foregoing formula, $\hat{D}$ represents a differential precoding matrix, and a differential PMI corresponding to $\hat{D}$ is expressed as $PMI_{dif}^*$, $\| \Box \|_F$ represents a Frobenius norm; $C_d$ represents the first differential codebook known by both the eNodeB and the UE; and $D_i$ represents a codeword in the first differential codebook $C_d$. It should be noted that, the first differential codebook here may be any differential codebook in the prior art according to the actual application condition. Besides, the quantization criteria of the first differential matrix D are not limited to the criteria shown in the formula (4), and may be other criteria selected according to the actual application condition, for example, maximum capacity criteria or various criteria based on a minimum distance.

205. The UE feeds back the differential $PMI_{dif}$ to the eNode B.

206. The eNode B performs eigenvalue decomposition on a second long-term channel covariance matrix $R_{NB}$ to obtain an eigen matrix $U_{NB}$ of the second long-term channel covariance matrix $R_{NB}$, and uses the eigen matrix $U_{NB}$ as a second rotation matrix; the eNode B receives the differential $PMI_{dif}$, and obtains a second differential matrix $\overline{D}$ according to the differential $PMI_{dif}$ and by using a second differential codebook and a pre-acquired second RI.

The second differential codebook and the second RI that are applied in this step are consistent with the first differential codebook and the first RI that are applied in step 204.

The second long-term channel covariance matrix $R_{NB}$ is obtained by the eNode B through averaging multiple channel matrixes obtained by the eNode B on a single or multiple subcarriers in the preset time period. When obtaining the second long-term channel covariance matrix $R_{NB}$, the method that is the same as the method for obtaining the first long-term channel covariance matrix $R_{UE}$ is applied to ensure that the $R_{UE}$ obtained by the UE is basically consistent with the $R_{NB}$ obtained by the eNode B. For example, if the UE uses the formula (1) to obtain $R_{UE}$ in step 201, the eNode B in this step uses the formula (1) to obtain $R_{NB}$, or makes the two consistent through other signaling interaction.

For example, the performing eigenvalue decomposition on the second long-term channel covariance matrix $R_{NB}$ is as shown in the formula (5):

$$R_{NB}=U_{NB}\Sigma_{NB}U_{NB}^H \quad (5)$$

$\Sigma_{NB}$ represents a diagonal matrix constructed by using the eigenvalue of $R_{NB}$ as a diagonal element; $U_{NB}$ represents a matrix constructed by using all eigenvectors of the second long-term channel covariance matrix $R_{NB}$ as columns. For ease of description, $U_{NB}$ is called the eigen matrix of the second long-term channel covariance matrix $R_{NB}$.

207. According to the second rotation matrix $U_{NB}$ and the second differential matrix $\overline{D}$, the eNode B reconstructs the BF matrix/precoding matrix $\hat{V}$ obtained in step 203, and then step 210 is executed.

For example, according to the second rotation matrix $U_{NB}$ and the second differential matrix $\overline{D}$, the BF matrix/precoding matrix $\hat{V}$ are reconstructed through the formula (6):

$$\overline{V}=U_{NB}\overline{D} \quad (6)$$

208. According to the currently-obtained instantaneous BF matrix/precoding matrix, the UE uses the first non-differential codebook and a pre-acquired third RI to obtain a non-differential PMI, and feeds back the non-differential PMI to the eNode B.

For example, the UE uses the first non-differential codebook and the pre-acquired third RI to quantize the currently-obtained instantaneous BF matrix/precoding matrix to obtain a non-differential PMI according to the maximum-capacity criteria and various criteria based on the minimum distance.

Alternatively, the non-differential PMI is obtained according to a method in a 3GPP LTE R8 system. A non-differential codebook used in the 3GPP LTE R8 system is as shown in Table 1. A non-differential PMI may be selected in Table 1 for feedback according to the actual application condition.

In the foregoing table, $W_n^{(s)}$ is a matrix formed by column sets $\{s\}$ of corresponding matrixe $W_n = I - 2u_n u_n^H / u_n^H u_n$ whose PMI is n, I is a 4×4 unit matrix, and $u_n$ is given in the foregoing Table 1.

Alternatively, the non-differential PMI is obtained through other methods in the prior art.

209. The eNode B receives the non-differential PMI, and obtains the BF matrix/precoding matrix $\hat{V}$ obtained in step 208 according to the non-differential PMI and by using the second non-differential codebook and a pre-acquired fourth RI.

For example, the second non-differential codebook and the fourth RI are consistent with the first non-differential codebook and the third RI respectively. Further, the BF matrix/precoding matrix $\hat{V}$ is obtained according to the corresponding method in step 208, which is not repeatedly described here.

210. The eNode B uses the obtained BF matrix/precoding matrix $\hat{V}$ to preprocess data s to be sent, and sends the preprocessed data s to be sent to the UE through a transmitting antenna.

211. The UE receives a reception signal y, and performs data detection on the reception signal y.

For example, the reception signal y received by the UE is as shown in the formula (7):

$$y=H\hat{V}s+n \quad (7)$$

In the foregoing formula, y represents the reception signal received by the UE; H represents the channel matrix; $\hat{V}$ represents the BF matrix/precoding matrix; s represents the data to be sent; and n represents additive Gaussian white noise.

It should be noted that, when the PMI is fed back, no matter whether the differential PMI or the non-differential PMI is fed back, a PMI may be fed back for an entire system bandwidth, or the system may be divided into multiple BPs (Bandwidth Part, bandwidth part), and each BP includes multiple sub-bands. A PMI is fed back for each sub-band.

It should be noted that, when the method in the embodiment of the present disclosure is applied to the uplink (namely, the UE sends data to the eNode B, and the eNode B

TABLE 1

| PMI | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | feeds back the precoding matrix to the UE), the eNode B in step 201 needs to decide whether to use the non-differential PMI or use the differential PMI based on the long-term channel covariance matrix for feedback. Further, the eNode B notifies the UE through high-layer signaling or a physical downlink control channel, and the UE receives the notification. Other processes are similar to the foregoing steps, and are not repeatedly described here.

In the method for obtaining a precoding matrix indicator in the embodiment of the present disclosure, a differential PMI is obtained according to the long-term channel covariance matrix, and the differential PMI is used for feedback. Therefore, the information that already exists in the channel may be used, which not only reduces an overhead, but also makes use of a correlation of a channel between a frequency domain and a time domain, thus improving the feedback accuracy, and fulfilling requirements of technologies such as MU-MIMO or CoMP. Further, whether to use non-differential feedback or differential feedback may be chosen, which may improve flexibility of the feedback.

Embodiment 3

Figure 3A:
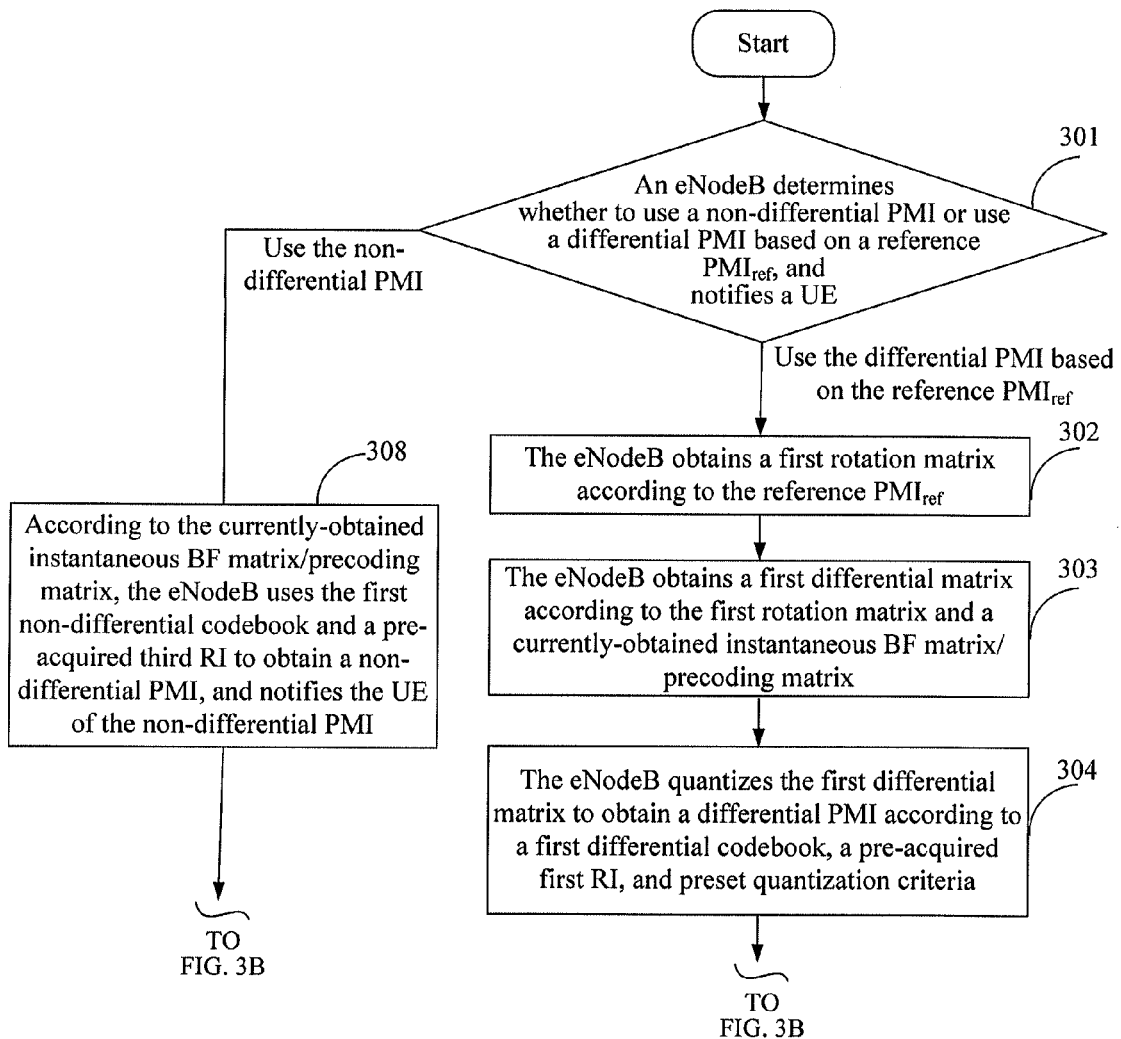
FIGS. 3a and 3b is a flowchart of a method for obtaining a precoding matrix indicator according to a third embodiment of the present disclosure.
Figure 3B:
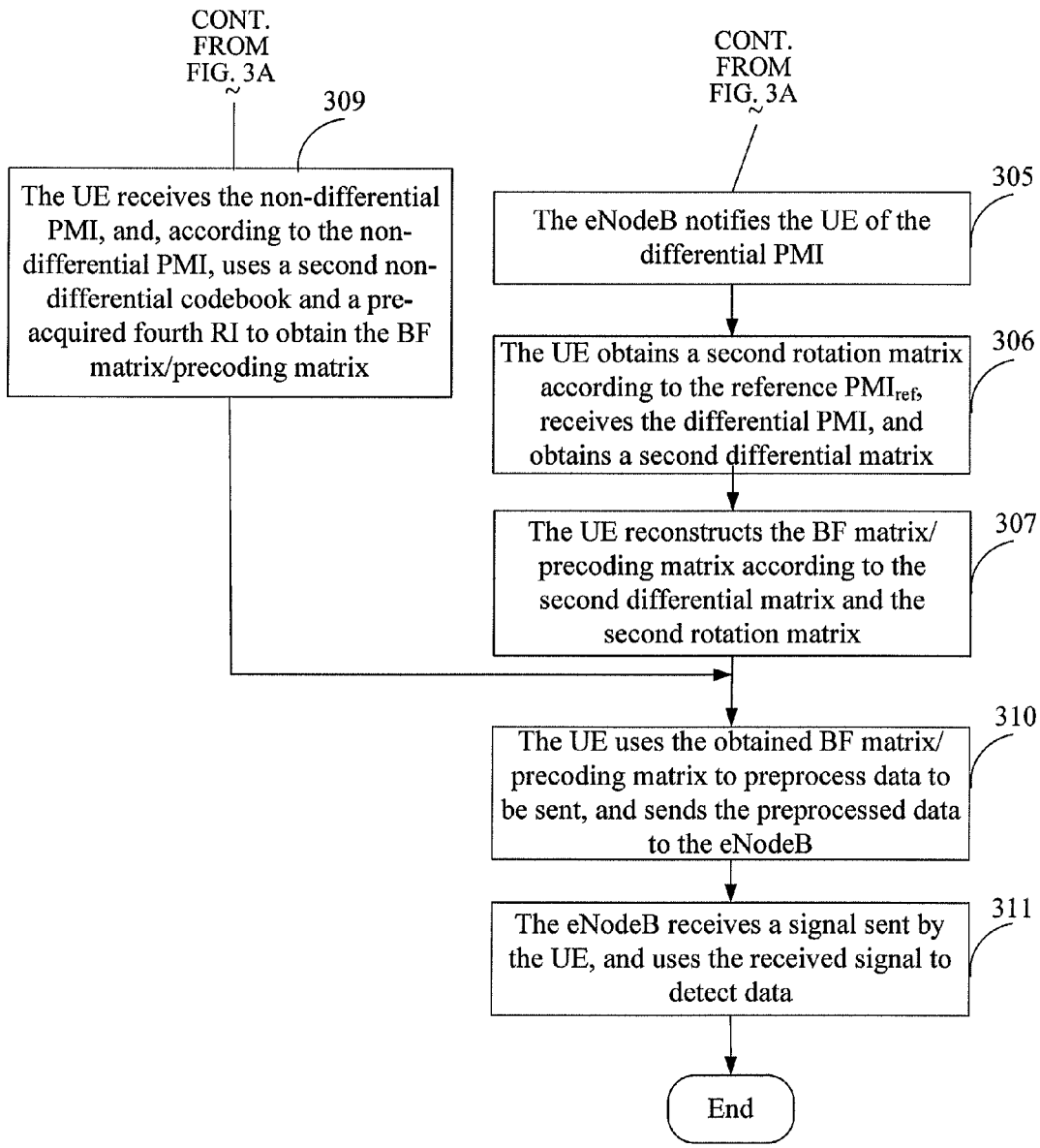

An embodiment of the present disclosure provides a method for obtaining a precoding matrix indicator. The method performs feedback by using a differential PMI based on a reference PMI (expressed by $PMI_{ref}$). The following takes the uplink (namely, a UE sends data to an eNode B, and the eNode B feeds back a PMI to the UE) as an example for description. As shown in FIG. 3, the method includes:

301. An eNodeB determines whether to use a non-differential PMI or a differential PMI based on a reference $PMI_{ref}$ for feedback, and notifies a UE. If the eNode B instructs the UE to use the non-differential PMI for feedback, step 308 is executed; if the eNode B instructs the UE to use the differential PMI based on the reference $PMI_{ref}$ for feedback, step 302 is executed.

The reference $PMI_{ref}$ may be: A non-differential broadband PMI or a non-differential neighboring sub-band PMI, which is used by the UE as instructed by the eNode B recently, may be used as the reference $PMI_{ref}$; or a non-differential PMI obtained by using non-differential codebook quantization and based on an eigen matrix of a long-term channel covariance matrix in step 208 in the embodiment 2 may be used as the reference $PMI_{ref}$. When the non-differential PMI obtained based on the long-term channel covariance matrix is used as the reference $PMI_{ref}$, the method for obtaining the long-term channel covariance matrix on the eNode B is the same as that on the UE. For example, the formula (1) in the embodiment 2 may be applied.

302. The eNode B obtains a first rotation matrix $Q_{NB}$ according to the reference $PMI_{ref}$.

For example, the obtaining the first rotation matrix $Q_{NB}$ according to the reference $PMI_{ref}$ may be:

(1) If the reference $PMI_{ref}$ is orthogonal to columns of a precoding matrix corresponding to a pre-acquired first rank indicator and the rank is full, normalize respective columns of the precoding matrix and use a normalized precoding matrix as the first rotation matrix $Q_{NB}$.

The normalizing the precoding matrix refers to: multiplying each column of the precoding matrix by a constant respectively to ensure that a modulus of a vector of each column in the precoding matrix is 1.

For example, the reference $PMI_{ref}$ is 3, and the pre-acquired first rank indicator is 4, and therefore, an applied codebook is as shown in Table 1. In Table 1, a full-rank precoding matrix corresponding to "PMI=3, RI=1" is $W_3^{\{3214\}}/2$, and the first rotation matrix $Q_{NB}$ obtained by normalizing $W_3^{\{3214\}}/2$ is as shown in the formula (8):

$$Q_{NB}=[W_3^{\{3214\}}/2]*2=W_3^{\{3214\}} \qquad (8)$$

(2) If the reference $PMI_{ref}$ is orthogonal to columns of a precoding matrix corresponding to a pre-acquired first rank indicator and the rank is not full, but a codebook corresponding to the reference $PMI_{ref}$ meets nesting characteristics, select a full-rank precoding matrix corresponding to the reference $PMI_{ref}$, normalize respective columns of the full-rank precoding matrix, and use a normalized full-rank precoding matrix as the first rotation matrix $Q_{NB}$.

That the codebook meets the nesting characteristics refers to: Each column in a low-rank codeword (each column being normalized) in the codebook is a subset of each column in a high-rank codeword (each column being normalized) in the codebook.

For example, the reference $PMI_{ref}$ is 6, and the pre-acquired first rank indicator is 2, and therefore, an applied codebook is as shown in Table 1. In Table 1, a precoding matrix corresponding to "PMI=6, RI=2" is $W_6^{\{13\}}/\sqrt{2}$, and the rank of $W_6^{\{13\}}/\sqrt{2}$ is not full, and therefore, a full-rank precoding matrix $W_6^{\{1324\}}/2$ corresponding to "PMI=6, RI=4" is selected, and the first rotation matrix $Q_{NB}$ obtained by normalizing $W_6^{\{1324\}}/2$ is as shown in the formula (9):

$$Q_{NB}=[W_6^{\{1324\}}/2]*2=W_6^{\{1324\}} \qquad (9)$$

For example, the obtaining the first rotation matrix $Q_{NB}$ according to the reference $PMI_{ref}$ may also be:

Normalize respective columns of precoding matrixes corresponding to the reference $PMI_{ref}$ and the pre-acquired first rank indicator; and perform QR decomposition for a normalized precoding matrix to obtain the first rotation matrix $Q_{NB}$.

For example, it is assumed that a precoding matrix is $\hat{V}_{ref}$ after the respective columns corresponding to the reference $PMI_{ref}$ are normalized, the performing the QR decomposition for the normalized precoding matrix $\hat{V}_{ref}$ is as shown in the formula (10):

$$\hat{V}_{ref} = Q_{ref} R_{ref} = [Q_1 \; Q_2]\begin{bmatrix} R_1 \\ 0 \end{bmatrix} = Q_1 R_1 \qquad (10)$$

In this way, the first rotation matrix $Q_{NB}$ may be obtained as:

$$Q_{NB}=[\hat{V}_{ref} Q_2 P]$$

In the foregoing formula, P is a unitary matrix negotiated between the eNode B and the UE.

It should be noted that, the method of the QR decomposition in the formula (10) may be based on the Householder (Householder) transformation, or the Givens (Givens) rotation, or the Gram-Schimdt (Gram-Schimdt) quadrature, or variations or combinations of such methods, provided that the eNodeB and the UE need to use the same QR decomposition method through negotiation.

For example, the obtaining the first rotation matrix $Q_{NB}$ according to the reference $PMI_{ref}$ mat be:

Multiply multiple different rotation matrixes obtained according to the reference $PMI_{ref}$ at different time to obtain a differential PMI. For example, the method shown in the formula (11) may be used to obtain the first rotation matrix $Q_{NB}$:

$$Q_{NB}=Q_{NBn}=Q_{NB1} \cdot Q_{NB2} \ldots Q_{NBn} \qquad (11)$$

In the foregoing formula, $Q_{NB1}$, $Q_{NB2}$ ... $Q_{NBn}$ may be obtained in the same method as that for obtaining the first rotation matrix $Q_{NB}$, $Q_{NBn}$ represents a rotation matrix at current time (or sub-band) that is obtained according to the reference $PMI_{ref}$ at the current time (or sub-band); and $Q_{NB2} \ldots Q_{NBn-1}$ represent rotation matrixes obtained according to the differential PMI at each time (or sub-band) before the current time (or sub-band) and by using the QR decomposition or the nesting characteristics of the codebook.

303. The eNode B obtains a first differential matrix D according to the first rotation matrix $Q_{NB}$ and a currently-obtained instantaneous BF matrix/precoding matrix V. This step is similar to step 203, and is not repeatedly described here.

304. The eNode B quantizes the first differential matrix D to obtain a differential PMI $\hat{D}$ according to a second differential codebook, a pre-acquired second RI, and preset quantization criteria. This step is similar to step 204, and is not repeatedly described here.

305. The eNode B notifies the UE of the differential PMI

306. The UE obtains a second rotation matrix $Q_{UE}$ according to the reference $PMI_{ref}$; the UE receives the differential PMI $\hat{D}$, and obtains a second differential matrix $\overline{D}$ according to the differential PMI $\hat{D}$ and by using the second differential codebook and the pre-acquired second RI.

The eNode B and the UE negotiate in advance to use the same reference $PMI_{ref}$. Moreover, the same method for obtaining the first rotation matrix $Q_{NB}$ in step 302 is applied, and the second rotation matrix $Q_{UE}$ is obtained according to the reference $PMI_{ref}$.

307. According to the second differential matrix $\overline{D}$ and the second rotation matrix $Q_{UE}$, the UE reconstructs a BF matrix/precoding matrix $\hat{V}$, and then step 310 is executed. This step is similar to step 207, and is not repeatedly described here.

308. According to the BF matrix/precoding matrix, the eNode B uses the first non-differential codebook and a pre-acquired third RI to obtain a non-differential PMI, and notifies the UE of the non-differential PMI.

This step is similar to step 208, and is not repeatedly described here.

309. The UE receives the second non-differential PMI, and, according to the second non-differential PMI, uses the second non-differential codebook and a pre-acquired fourth RI to obtain the BF matrix/precoding matrix $\hat{V}$. This step is similar to step 209, and is not repeatedly described here.

310. The UE uses the obtained BF matrix/precoding matrix $\hat{V}$ to preprocess data s to be sent, and sends the preprocessed data s to be sent to the eNode B through a transmitting antenna. This step is similar to step 210, and is not repeatedly described here.

311. The eNodeB receives a reception signal y, and uses y to perform data detection. This step is similar to step 211, and is not repeatedly described here.

It should be noted that, when the PMI is fed back, no matter whether the differential PMI or the non-differential PMI is fed back, a PMI may be fed back for an entire system bandwidth, or the system may be divided into multiple BPs, and each BP includes multiple sub-bands. A PMI is fed back for each sub-band.

Moreover, it should be noted that, when the method in the embodiment of the present disclosure is applied to the downlink (namely, the eNode B sends data to the UE, and the UE feeds back the precoding matrix indicator to the eNode B), the eNodeB in step 301 needs to instruct the UE whether to use the non-differential PMI or use the differential PMI based on the reference PMI for feedback. Other processes are similar to the foregoing steps, and are not repeatedly described here.

In the method for obtaining a precoding matrix indicator in the embodiment of the present disclosure, a differential PMI is obtained according to the reference PMI, and the differential PMI is used for feedback. Therefore, the information that already exists in the channel may be used, which makes use of a correlation of a channel between a frequency domain and a time domain, thus improving the feedback accuracy, and fulfilling requirements of technologies such as MU-MIMO or CoMP. Further, whether to use non-differential feedback or differential feedback may be chosen, which may improve flexibility of the feedback.

Embodiment 4

An embodiment of the present disclosure provides a method for obtaining a precoding matrix indicator. This embodiment differs from the embodiment 2 and the embodiment 3 in that: In this embodiment, a current differential PMI may be obtained based on a long-term channel covariance matrix and a previous differential PMI, as detailed below:

For a UE, through a method shown in the formula (12), and based on the long-term channel covariance matrix and a reference $PMI_{ref}$, a rotation matrix $Q_{UEn}$ may be obtained:

$$Q_{UEn} = U_{UE} \cdot Q_{UE1} \cdot Q_{UE2} \ldots Q_{UEn} \quad (12)$$

In the foregoing formula, $U_{UE}$ may be obtained in the same method as that for obtaining the first rotation matrix $U_{UE}$ in the embodiment 2. $U_{UE}$ may be called a first reference rotation matrix. $Q_{UE1} \cdot Q_{UE2} \ldots Q_{UEn}$ may be obtained in the same method as that for obtaining the first rotation matrix $Q_{NB}$ in the embodiment 3. $Q_{UE1}$ represents a rotation matrix at current time (or sub-band) that is obtained according to a reference $PMI_{ref}$ at the current time (or sub-band); and $Q_{UE2} \ldots Q_{UEn}$ represent rotation matrixes obtained according to a differential PMI after $Q_{UE1}$. $Q_{UE1}$ represents a reference rotation matrix at each time (or sub-band) before the current time (or sub-band), where the reference rotation matrix is obtained according to the reference $PMI_{ref}$ at each time (or sub-band) before the current time (or sub-band); and $Q_{UE2} \ldots Q_{UEn-1}$ represent rotation matrixes obtained according to a differential PMI after $Q_{UE1}$ and by using the QR decomposition or the nesting characteristics of the codebook.

Accordingly, for an eNode B, through a method shown in the formula (13), based on the long-term channel covariance matrix and the reference $PMI_{ref}$, a rotation matrix $Q_{NBn}$ is obtained:

$$Q_{NBn} = U_{NB} \cdot Q_{NB1} \cdot Q_{NB2} \ldots Q_{Nbn} \quad (13)$$

In the foregoing formula, $U_{NB}$ may be obtained in the same method as that for obtaining the second rotation matrix $U_{NB}$ in the embodiment 2, and $Q_{NB1}, Q_{NB2} \ldots Q_{NBn}$ may be obtained in the same method as that for obtaining the first rotation matrix $Q_{NB}$ in the embodiment 3. The detailed meanings are similar to those in the formula (12), and are not repeatedly described here.

If the rotation matrix is obtained in the embodiment 2 by using the method used in this embodiment, in step 201 of the embodiment 2, the eNode B needs to instruct the UE to use the non-differential PMI or use the differential PMI based on the long-term channel covariance matrix and the reference $PMI_{ref}$, and other processes are similar to those in the embodiment 2, and are not repeatedly described here.

If the rotation matrix is obtained in the embodiment 3 by using the method used in this embodiment, in step 301 of the embodiment 3, the eNode B needs to determine whether the eNode B uses the non-differential PMI or uses the differential PMI based on the long-term channel covariance matrix and the reference $PMI_{ref}$ for feedback, and notifies the UE; and other processes are similar to those in the embodiment 3, and are not repeatedly described here.

In the method for obtaining a precoding matrix indicator in the embodiment of the present disclosure, a differential PMI is obtained based on the long-term channel covariance matrix and the reference PMI, and the differential PMI is used for feedback. Therefore, the information that already exists in the channel may be used, which not only reduces an overhead, but also makes use of a correlation of a channel between a frequency domain and a time domain, thus improving the feedback accuracy, and fulfilling requirements of technologies such as MU-MIMO or CoMP. Further, whether to use non-differential feedback or differential feedback may be chosen, which may improve flexibility of the feedback.

Embodiment 5

With the increase of transmitting antennas, a dual-polarization transmitting antenna becomes a popular configuration. A codebook in an existing LTE R8 system does not optimize the dual-polarization antenna configuration specially. Currently in a 3GPP LTE-A (LTE-Advance, LTE advanced evolution) downlink system, the number of transmitting antennas is further increased. Therefore, an embodiment of the present disclosure provides a method for obtaining a precoding matrix indicator, and this method differs from the methods in the embodiments 2, 3, and 4 in that: A codebook in this embodiment (differential codebook or non-differential codebook) is not the codebook in the prior art, but is a codebook (also known as dual-polarization codebook) that corresponds to the configuration of the dual-polarization transmitting antenna and is obtained according to a codebook (also known as single-polarization codebook) corresponding to the configuration of a single-polarization transmitting antenna in the prior art.

For example, assume that a codebook corresponding to the configuration of N (N is an even number) single-polarization transmitting antennas include $2^L$ codewords (precoding matrix), where L represents the number of information bits occupied by feedback of one of the codewords (if the feedback of a single codeword in the single-polarization codebook needs L bits of information, the feedback of a single codeword in the dual-polarization codebook needs L+1 bits of information). An $i^{th}$ codeword is expressed as $W_i$=0, 1 ... $2^L$−1. Assume that the first N/2 (1, 2, 3 ... N/2) antennas in the configuration of N dual-polarization transmitting antennas are a group of co-polarization antennas, and the last N/2 (N/2+1, N/2+2 ... N) antennas are another group of co-polarization antennas, and therefore, in a codebook (also known as the dual-polarization codebook) corresponding to the configuration of the N dual-polarization transmitting antennas, an $i^{th}$ codeword $W'_i$ may be expressed as shown in the formula (14):

$$W'_i = W_i \; i=0,1,\ldots,2^L-1 \quad (14)$$

or may be expressed as shown in the formula (15):

$$W'_i = \text{diag}\{1,\ldots,1,-1,\ldots,-1\} \; W_{i-2^L}, \; i=2^L, 1, \ldots, 2^{L+1}-1 \quad (15)$$

In the foregoing formula, diag $\{1, \ldots, 1, -1, \ldots, -1\}$ represents a diagonal matrix in which the first N/2 diagonal elements are 1s, and the last N/2 diagonal elements are −1s.

It should be noted that, if the number sequence of the antennas changes, the corresponding rows in (15) need to be exchanged. For example, in the N dual-polarization transmitting antennas, a $1^{st}$ antenna, a $3^{rd}$ antenna, a $5^{th}$ antenna, ..., and a N-$1^{th}$ antenna are a group of co-polarization antennas, and a $2^{nd}$ antenna, a $4^{th}$ antenna, a $6^{th}$ antenna, ..., and an N$^{th}$ antenna are another group of co-polarization antennas. At this time, the diagonal elements of the diagonal matrix are 1, −1, 1, −1, 1, −1, ..., 1, and −1.

Other aspects of the embodiment of the present disclosure are the same as those in the embodiments 2, 3 and 4, and are not repeatedly described here one by one.

In the method for obtaining a precoding matrix indicator in the embodiment of the present disclosure, a differential PMI is obtained according to the channel information, and the differential PMI is used for feedback. Therefore, the information that already exists in the channel may be used, which not only reduces an overhead, but also makes use of a correlation of a channel between a frequency domain and a time domain, thus improving the feedback accuracy, and fulfilling requirements of technologies such as MU-MIMO or CoMP. Further, whether to use the non-differential PMI or the differential PMI for feedback may be chosen, which may improve flexibility of the feedback. Moreover, the codebook of the dual-polarization transmitting antenna is constructed based on the codebook of the single-polarization transmitting antenna, which may make full use of the features of the configuration of the dual-polarization transmitting antenna, and improve performance of the codebook under the configuration of the dual-polarization transmitting antenna.

Embodiment 6

Currently, two types of codebooks exist in a 3GPP LTE-A uplink system, namely a CMF (Cubic Metric Friendly, cubic metric friendly) codebook and a CMP (Cubic Metric Preserving, cubic metric preserving) codebook. The CMF codebook is applicable to a power-unrestricted scenario, but the CMP codebook is applicable to a power-restricted scenario. Therefore, an embodiment of the present disclosure provides a method for obtaining a precoding matrix indicator. The method in this embodiment differs from the methods in the embodiments 2, 3, 4, and 5 in that: In this embodiment, a codebook may be selected according to PH (Power Headroom, power headroom) of a UE, which includes the following two modes:

Mode 1: A UE judges whether PH of the UE fulfills the formula (16) according to the PH of the UE and a preset power headroom threshold $\delta_{threshold}$. If the PH of the UE fulfills the formula (16), the UE uses the CMF codebook; if the PH of the UE does not fulfill the formula (16), the UE uses the CMP codebook.

$$PH \geq \delta_{threshold} \quad (16)$$

Meanwhile, an eNode B also judges whether the PH of the UE fulfills the formula (16) according to the pre-acquired PH of the UE and the preset power headroom threshold $\delta_{threshold}$. If the PH of the UE fulfills the formula (16), the eNode B chooses to use the CMF codebook; if the PH of the UE does not fulfill the formula (16), the eNode B uses the CMP codebook. It should be noted that, this mode assumes that the UE and the eNode B pre-acquire information about the preset power headroom threshold $\delta_{threshold}$. Moreover, in the prior art, the UE and the eNode B both know the information about the PH of the UE.

Mode 2: An eNode B judges whether the PH of the UE fulfills the formula (16) according to the pre-acquired PH of the UE and the preset power headroom threshold $\delta_{threshold}$. If the PH of the UE fulfills the formula (16), the eNode B chooses to use the CMF codebook, and instructs the UE to use the CMF codebook; if the PH of the UE does not fulfill the formula (16), the eNodeB uses the CMP codebook, and instructs the UE to use the CMF codebook.

In the method for obtaining a precoding matrix indicator in the embodiment of the present disclosure, a differential PMI is obtained according to the channel information, and the differential PMI is used for feedback. Therefore, the information that already exists in the channel may be used, which not only reduces an overhead, but also makes use of a correlation of a channel between a frequency domain and a time domain, thus improving the feedback accuracy, and fulfilling requirements of technologies such as MU-MIMO or CoMP. Further, whether to use the non-differential PMI or the differential PMI for feedback may be chosen, which may improve flexibility of the feedback. Moreover, adaptive switching between the CMP codebook and the CMF codebook may be performed according to the power headroom, and advantages of the CMP codebook and the CMF codebook may be made use of according to the current power usage of the UE or the eNode B.

Embodiment 7

Figure 4:
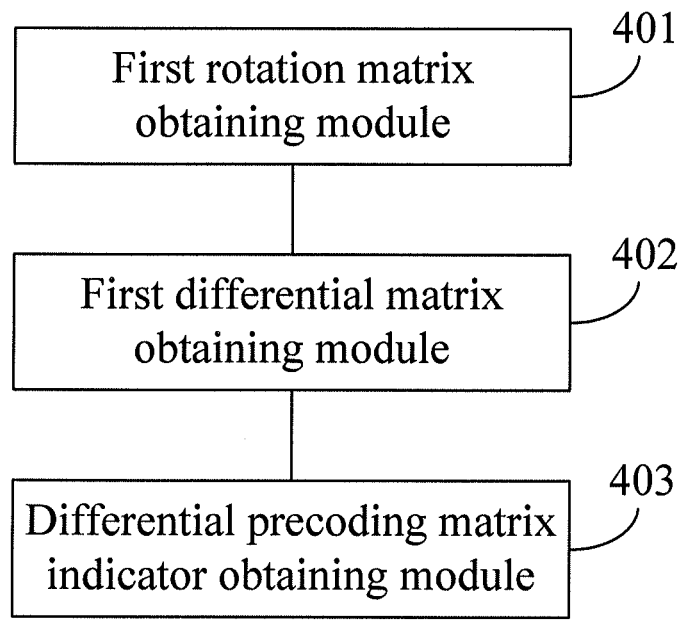
FIG. 4 is a schematic structural diagram of an apparatus for obtaining a precoding matrix indicator according to a seventh embodiment of the present disclosure.

An embodiment of the present disclosure provides an apparatus for obtaining a precoding matrix indicator. As shown in FIG. 4, the apparatus includes:

a first rotation matrix obtaining module 401, configured to obtain a first rotation matrix according to first channel information;

a first differential matrix obtaining module 402, configured to obtain a first differential matrix according to the first rotation matrix and a currently-obtained instantaneous beam forming matrix/precoding matrix after the first rotation matrix obtaining module 401 obtains the first rotation matrix; and a differential precoding matrix indicator obtaining module 403, configured to quantize, according to a first differential codebook, a pre-acquired first rank indicator, and preset quantization criteria, the first differential matrix to obtain a differential precoding matrix indicator after the first differential matrix obtaining module 402 obtains the differential matrix.

When the first channel information is a first long-term channel covariance matrix, the first rotation matrix obtaining module 401 may include:

an eigen matrix obtaining unit, configured to perform eigenvalue decomposition on the first long-term channel covariance matrix to obtain an eigen matrix of the first long-term channel covariance matrix, where the first long-term channel covariance matrix is obtained by averaging multiple channel matrixes obtained locally on a single or multiple subcarriers in a preset time period; and a first rotation matrix obtaining unit, configured to use the eigen matrix of the first long-term channel covariance matrix as the first rotation matrix after the characteristic matrix obtaining unit obtains the eigen matrix.

When the first channel information is a reference precoding matrix indicator, the first rotation matrix obtaining module 401 may include:

a second rotation matrix obtaining unit, configured to normalize respective columns of the precoding matrix and use a normalized precoding matrix as the first rotation matrix if the reference precoding matrix indicator is orthogonal to columns of a precoding matrix corresponding to the pre-acquired first rank indicator and the rank is full; and a third rotation matrix obtaining unit, configured to: select a full-rank precoding matrix corresponding to the reference precoding matrix indicator, normalize respective columns of the full-rank precoding matrix, and use a normalized full-rank precoding matrix as the first rotation matrix if the reference precoding matrix indicator is orthogonal to columns of a precoding matrix corresponding to the pre-acquired first rank indicator and the rank is not full, but a codebook corresponding to the reference precoding matrix indicator meets nesting characteristics.

When the first channel information is a reference precoding matrix indicator, the first rotation matrix obtaining module 401 may include:

a fourth rotation matrix obtaining unit, configured to normalize respective columns of precoding matrixes corresponding to the reference precoding matrix indicator and the pre-acquired first rank indicator; and perform QR decomposition for a normalized precoding matrix to obtain the first rotation matrix.

Figure 5:
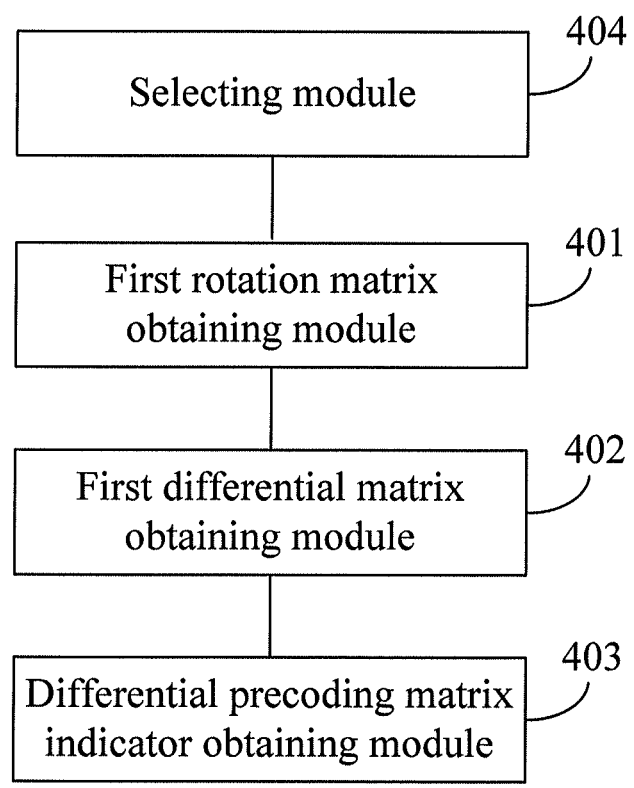
FIG. 5 is a schematic structural diagram of another apparatus for obtaining a precoding matrix indicator according to a seventh embodiment of the present disclosure.

Further, as shown in FIG. 5, the apparatus may further include:

a selecting module 404, configured to: from a power-restricted differential codebook and a power-unrestricted differential codebook, select one codebook as a first differential codebook according to local power headroom and a preset power headroom threshold value when the power-restricted differential codebook and the power-unrestricted differential codebook exist locally.

Figure 6:
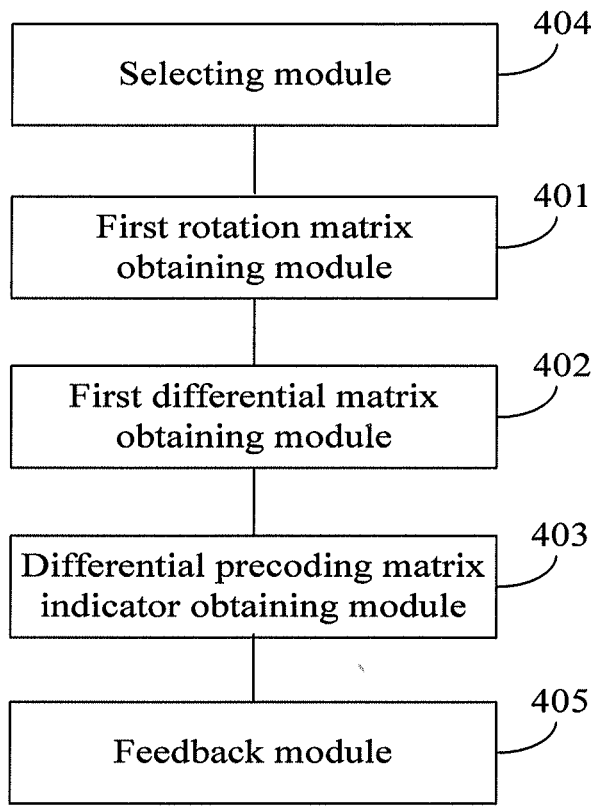
FIG. 6 is a schematic structural diagram of another apparatus for obtaining a precoding matrix indicator according to a seventh embodiment of the present disclosure.

Further, as shown in FIG. 6, the apparatus may further include:

a feedback module 405, configured to: feed back the differential precoding matrix indicator to a data sender after the differential precoding matrix indicator obtaining module 403 obtains the differential precoding matrix indicator, so that the data sender reconstructs a beam forming matrix/precoding matrix according to the differential precoding matrix indicator and an obtained second rotation matrix and by using a second differential codebook and a pre-acquired second rank indicator, where the second rotation matrix is obtained by the data sender according to the second channel information, and the second channel information, the second rotation matrix, the second differential codebook, and the second rank indicator are consistent with the first channel information, the first rotation matrix, the first differential codebook, and the first rank indicator respectively.

Through the apparatus for obtaining a precoding matrix indicator in the embodiment of the present disclosure, the differential PMI is obtained according to the channel information, the differential PMI is used for feedback, and the information that already exists in the channel may be used, which not only reduces an overhead, but also makes full use of a correlation of a channel between a frequency domain and a time domain, thus improving the feedback accuracy, and fulfilling requirements of technologies such as MU-MIMO or CoMP.

Embodiment 8

Figure 7:
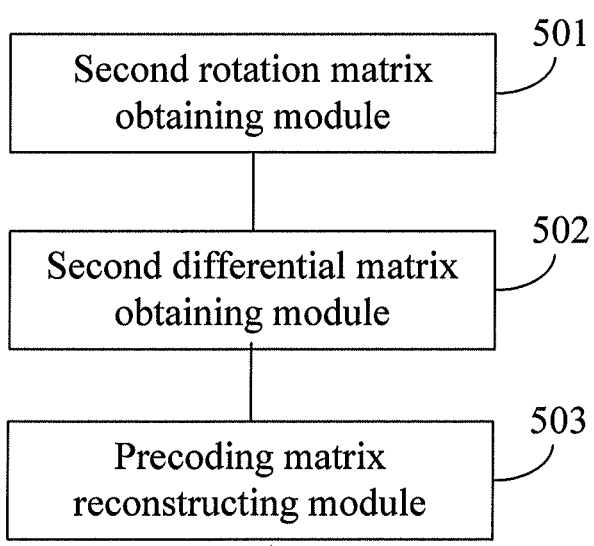
FIG. 7 is a schematic structural diagram of a data sending apparatus according to an eighth embodiment of the present disclosure.

An embodiment of the present disclosure provides a data sending apparatus. As shown in FIG. 7, the apparatus includes:

a second rotation matrix obtaining module 501, configured to obtain a second rotation matrix according to second channel information;

a second differential matrix obtaining module 502, configured to: obtain a second differential matrix according to a received differential precoding matrix indicator and by using a second differential codebook and a pre-acquired second rank indicator, where the differential precoding matrix indicator is obtained by a data receiving apparatus according to a first rotation matrix and an instantaneous beam forming matrix/precoding matrix, which are obtained by the data receiving apparatus, and by using a first differential codebook and a pre-acquired first rank indicator, the first rotation matrix is obtained according to a first channel message, the second channel information is consistent with the first channel information, and the second differential codebook and the second rank indicator are consistent with the first differential codebook and the first rank indicator respectively; and a precoding matrix reconstructing module 503, configured to reconstruct a beam forming matrix/precoding matrix according to the second rotation matrix obtained by the second rotation matrix obtaining module 501 and the differential matrix obtained by the second differential matrix obtaining module 502. When the second channel information is a second long-term channel covariance matrix, the obtaining the second rotation matrix according to the second channel information may include:

performing eigenvalue decomposition on the second long-term channel covariance matrix to obtain an eigen matrix of the second long-term channel covariance matrix, where the second long-term channel covariance matrix is obtained by averaging multiple channel matrixes obtained locally on multiple subcarriers in a preset time period; and using the eigen matrix of the second long-term channel covariance matrix as the second rotation matrix.

When the second channel information is a reference precoding matrix indicator, the obtaining the second rotation matrix according to the second channel information may include:

if the reference precoding matrix indicator is orthogonal to columns of a precoding matrix corresponding to the pre-acquired second rank indicator and the rank is full, normalizing the precoding matrix and using a normalized precoding matrix as the second rotation matrix; and if the reference precoding matrix indicator is orthogonal to columns of a precoding matrix corresponding to the pre-acquired second rank indicator and the rank is not full, but a codebook corresponding to the reference precoding matrix indicator meets nesting characteristics, selecting a full-rank precoding matrix corresponding to the reference precoding matrix indicator, normalizing respective columns of the full-rank precoding matrix, and using the normalized full-rank precoding matrix as the second rotation matrix.

When the second channel information is a reference precoding matrix indicator, the obtaining the second rotation matrix according to the second channel information may include:

normalizing respective columns of precoding matrixes corresponding to the reference precoding matrix indicator and the pre-acquired second rank indicator; and performing QR (quadrature right-triangle) decomposition for a normalized precoding matrix to obtain the second rotation matrix.

Through the data sending apparatus in the embodiment of the present disclosure, by using the differential PMI obtained according to the channel information, the beam forming matrix/precoding matrix is reconstructed. Therefore, the information that already exists in the channel may be used, which not only reduces an overhead, but also makes full use of a correlation of a channel between a frequency domain and a time domain, thus improving the accuracy of the reconstructed beam forming matrix/precoding matrix, and fulfilling requirements of technologies such as MU-MIMO or CoMP.

Embodiment 9

Figure 8:
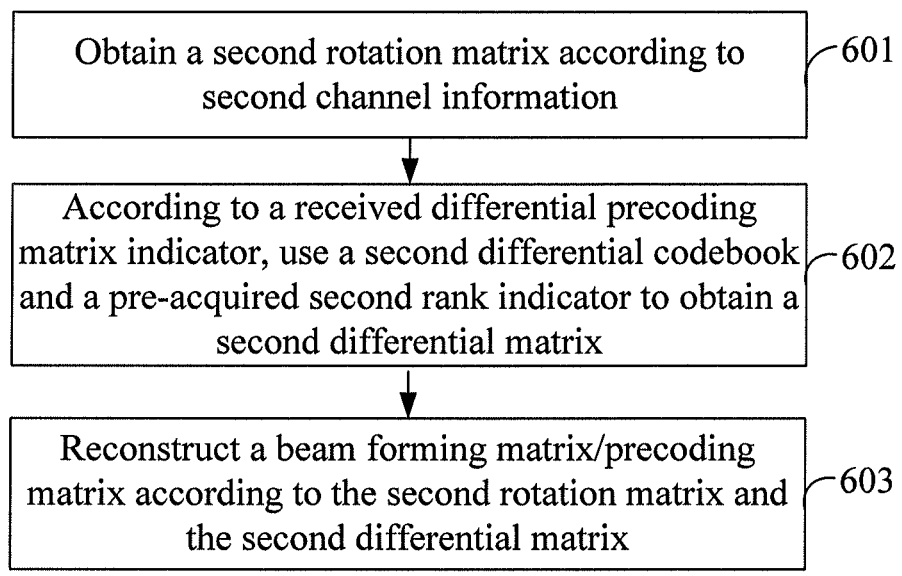
FIG. 8 is a flowchart of a method for reconstructing a beam forming matrix/precoding matrix according to a ninth embodiment of the present disclosure.

An embodiment of the present disclosure provides a method for reconstructing a beam forming matrix/precoding matrix. As shown in FIG. 8, the method includes:

601. Obtain a second rotation matrix according to second channel information.

When the second channel information is a second long-term channel covariance matrix, the obtaining the second rotation matrix according to the second channel information may include:

perform eigenvalue decomposition on the second long-term channel covariance matrix to obtain an eigen matrix of the second long-term channel covariance matrix, where the second long-term channel covariance matrix is obtained by averaging multiple channel matrixes obtained locally on a single or multiple subcarriers in a preset time period; and using an eigen matrix of the second long-term channel covariance matrix as the second rotation matrix.

When the second channel information is a reference precoding matrix indicator, the obtaining the second rotation matrix according to the second channel information may include:

if the reference precoding matrix indicator is orthogonal to columns of a precoding matrix corresponding to a pre-acquired second rank indicator and the rank is full, normalizing respective columns of the precoding matrix and using a normalized precoding matrix as the second rotation matrix; and if the reference precoding matrix indicator is orthogonal to columns of a precoding matrix corresponding to a pre-acquired second rank indicator and the rank is not full, but a codebook corresponding to the reference precoding matrix indicator meets nesting characteristics, selecting a full-rank precoding matrix corresponding to the reference precoding matrix indicator, normalizing respective columns of the full-rank precoding matrix, and using a normalized full-rank precoding matrix as the second rotation matrix.

When the second channel information is a reference precoding matrix indicator, the obtaining the second rotation matrix according to the second channel information may include:

normalizing respective columns of precoding matrixes corresponding to the reference precoding matrix indicator and the pre-acquired second rank indicator; and performing QR (quadrature right-triangle) decomposition for a normalized precoding matrix to obtain the second rotation matrix.

602. According to the received differential precoding matrix indicator, use the second differential codebook and the pre-acquired second rank indicator to obtain the second differential matrix.

The differential precoding matrix indicator is obtained by a data receiving apparatus according to a first rotation matrix and an instantaneous beam forming matrix/precoding matrix, which are obtained by the data receiving apparatus, and by using the first differential codebook and the pre-acquired first rank indicator, where the first rotation matrix is obtained according to a first channel message, the second channel information is consistent with the first channel information, and the second differential codebook and the second rank indicator are consistent with the first differential codebook and the first rank indicator respectively.

603. Reconstruct a beam forming matrix/precoding matrix according to the second rotation matrix and the second differential matrix.

In the method for reconstructing the beam forming matrix/precoding matrix in the embodiment of the present disclosure, by using the differential PMI obtained according to the channel information, the beam forming matrix/precoding matrix is reconstructed. Therefore, the information that already exists in the channel may be used, which not only reduces an overhead, but also makes full use of a correlation of a channel between a frequency domain and a time domain, thus improving the accuracy of the reconstructed beam forming matrix/precoding matrix, and fulfilling requirements of technologies such as MU-MIMO or CoMP.

All or part of the contents in the technical solutions provided in the foregoing embodiments may be implemented through software programming, and a software program is stored in a readable storage medium such as a hard disk, an optical disk or a floppy disk in a computer.

The foregoing descriptions are merely exemplary embodiments of the present disclosure, but are not intended to limit the present disclosure. Any modifications, equivalent replacement or improvement without departing from the spirit and principles of the present disclosure shall fall within the protection scope of the present disclosure.

What is claimed is:

1. A method for obtaining a precoding matrix indicator, comprising:
    obtaining a first rotation matrix according to first channel information;
    obtaining a first differential matrix according to the first rotation matrix and an instantaneous beam forming matrix/precoding matrix that is obtain currently; and
    quantizing, according to a first differential codebook, a pre-acquired first rank indicator, and preset quantization criteria, the first differential matrix to obtain a differential precoding matrix indicator;
    wherein the first channel information is one of a first long-term channel covariance matrix and a reference precoding matrix indicator; and
    when the first channel information is the first long-term channel covariance matrix, obtaining the first rotation matrix according to the first channel information comprises: performing eigenvalue decomposition on the first long-term channel covariance matrix to obtain an eigen matrix of the first long-term channel covariance matrix, wherein the first long-term channel covariance matrix is obtained by averaging multiple channel matrixes obtained at one of a user equipment and an evolved node B (eNB) on a single or multiple subcarriers in a preset time period; and using the eigen matrix of the first long-term channel covariance matrix as the first rotation matrix; or
    when the first channel information is the reference precoding matrix indicator, the obtaining the first rotation matrix according to the first channel information comprises: if the reference precoding matrix indicator is orthogonal to columns of a precoding matrix corresponding to the pre-acquired first rank indicator and the rank is full, normalizing respective columns of the precoding matrix and using a normalized precoding matrix as the first rotation matrix; if the reference precoding matrix indicator is orthogonal to columns of a precoding matrix corresponding to the pre-acquired first rank indicator and the rank is not full, but a codebook corresponding to the reference precoding matrix indicator meets nesting characteristics, selecting a full-rank precoding matrix corresponding to the reference precoding matrix indicator, normalizing respective columns of the full-rank precoding matrix, and using a normalized full-rank precoding matrix as the first rotation matrix; or, if the first channel information is the reference precoding matrix indicator, the obtaining the first rotation matrix according to the first channel information comprises: normalizing respective columns of precoding matrixes corresponding to the reference precoding matrix indicator and the pre-acquired first rank indicator; and performing QR decomposition for a normalized precoding matrix to obtain the first rotation matrix.

2. The method according to claim 1, wherein: after the obtaining the differential precoding matrix indication, the method further comprises:
    feeding back the differential precoding matrix indicator to a data sender, so that the data sender reconstructs a beam forming matrix/precoding matrix according to the differential precoding matrix indicator and an obtained second rotation matrix and by using a second differential codebook and a pre-acquired second rank indicator, wherein the second rotation matrix is obtained by the data sender according to the second channel information, and the second channel information, the second rotation matrix, the second differential codebook, and the second rank indicator are the same as the first channel information, the first rotation matrix, the first differential codebook, and the first rank indicator respectively.

3. The method according to claim 1, wherein: before the obtaining the first rotation matrix according to the first channel information, the method further comprises:
    obtaining a message of using a differential precoding matrix indicator or a non-differential precoding matrix indicator for feedback;
    performing the step of obtaining the first rotation matrix according to the first channel information when obtaining the message of using the differential precoding matrix indicator for feedback; and
    using a first non-differential codebook and a pre-acquired third rank indicator to obtain a non-differential precoding matrix indicator according to the instantaneous beam forming matrix/precoding matrix when obtaining the message of using the non-differential precoding matrix indicator for feedback.

4. The method according to claim 3, wherein:
    the non-differential precoding matrix indicator is fed back for an entire system bandwidth or for each sub-band; and
    the differential precoding matrix indicator is fed back for the entire system bandwidth or for each sub-band.

5. The method according to claim 3, wherein:
    when a local system has the configuration of N dual-polarization transmitting antennas, the first non-differential codebook is a dual-polarization non-differential codebook; the dual-polarization non-differential codebook is obtained according to a single-polarization non-differential codebook that comprises $2^L$ codewords; the non-differential dual-polarization codebook comprises $2^{L+1}$ codewords; in the non-differential dual-polarization codebook, $2^L$ codewords are the same as those in the non-differential single-polarization codebook; other $2^L$ codewords are obtained by left-multiplying each codeword in the non-differential single-polarization codebook by a preset diagonal matrix, wherein N is an even number greater than or equal to 2, and L represents the number of information bits occupied by feedback of a codeword in the non-differential single-polarization codebook.

6. The method according to claim 3, wherein: when both a power-restricted non-differential codebook and a power-unrestricted non-differential codebook exist at the one of the user equipment and the eNB, the method further comprises:
    from the power-restricted non-differential codebook and the power-unrestricted non-differential codebook, selecting one codebook as the first non-differential codebook according to power headroom at the one of the user equipment and the eNB and a preset power headroom threshold value.

7. An apparatus for obtaining a precoding matrix indicator, comprising:

a first rotation matrix obtaining module, configured to obtain a first rotation matrix according to first channel information;

a first differential matrix obtaining module, configured to obtain a first differential matrix according to the first rotation matrix and an instantaneous beam forming matrix/precoding matrix that is obtained currently after the first rotation matrix obtaining module obtains the first rotation matrix; and a differential precoding matrix indicator obtaining module, configured to quantize, according to a first differential codebook, a pre-acquired first rank indicator, and preset quantization criteria, the first differential matrix to obtain a differential precoding matrix indicator after the first differential matrix obtaining module obtains the differential matrix;

wherein the first channel information is one of a first long-term channel covariance matrix and a reference precoding matrix indicator; and when the first channel information is the first long-term channel covariance matrix, the first rotation matrix obtaining module comprises: an eigen matrix obtaining unit, configured to perform eigenvalue decomposition on the first long-term channel covariance matrix to obtain an eigen matrix of the first long-term channel covariance matrix, wherein the first long-term channel covariance matrix is obtained by averaging multiple channel matrixes obtained locally on a single or multiple subcarriers in a preset time period; and a first rotation matrix obtaining unit, configured to use the eigen matrix of the first long-term channel covariance matrix as the first rotation matrix after the eigen matrix obtaining unit obtains the eigen matrix; or when the first channel information is the reference precoding matrix indicator, the first rotation matrix obtaining module comprises: a second rotation matrix obtaining unit, configured to normalize respective columns of a precoding matrix and use a normalized precoding matrix as the first rotation matrix if the reference precoding matrix indicator is orthogonal to columns of the precoding matrix corresponding to the pre-acquired first rank indicator and the rank is full; and a third rotation matrix obtaining unit, configured to: select a full-rank precoding matrix corresponding to the reference precoding matrix indicator, normalize respective columns of the full-rank precoding matrix, and use a normalized full-rank precoding matrix as the first rotation matrix if the reference precoding matrix indicator is orthogonal to columns of a precoding matrix corresponding to the pre-acquired first rank indicator and the rank is not full, but a codebook corresponding to the reference precoding matrix indicator meets nesting characteristics; or, if the first channel information is the reference precoding matrix indicator, the first rotation matrix obtaining module comprises: a fourth rotation matrix obtaining unit, configured to normalize respective columns of precoding matrixes corresponding to the reference precoding matrix indicator and the pre-acquired first rank indicator; and perform QR decomposition for a normalized precoding matrix to obtain the first rotation matrix.

8. The apparatus according to claim 7, further comprising:

a selecting module, configured to: from a power-restricted differential codebook and a power-unrestricted differential codebook, select one codebook as a first differential codebook according to power headroom at the apparatus and a preset power headroom threshold value if the power-restricted differential codebook and the power-unrestricted differential codebook exist at the apparatus.

9. The apparatus according to claim 7, further comprising:

a feedback module, configured to: feed back the differential precoding matrix indicator to a data sender after the differential precoding matrix indicator obtaining module obtains the differential precoding matrix indicator, so that the data sender reconstructs a beam forming matrix/precoding matrix according to the differential precoding matrix indicator and an obtained second rotation matrix and by using a second differential codebook and a pre-acquired second rank indicator, wherein the second rotation matrix is obtained by the data sender according to the second channel information, and the second channel information, the second rotation matrix, the second differential codebook, and the second rank indicator are the same as the first channel information, the first rotation matrix, the first differential codebook, and the first rank indicator respectively.

10. A data sending apparatus, comprising:

a rotation matrix obtaining module, configured to obtain a second rotation matrix according to second channel information;

a differential matrix obtaining module, configured to: obtain a differential matrix according to a received differential precoding matrix indicator and by using a differential codebook and a pre-acquired second rank indicator, wherein the differential precoding matrix indicator is obtained by a data receiving apparatus according to a first rotation matrix and an instantaneous beam forming matrix/precoding matrix, which are obtained by the data receiving apparatus, and by using a first differential codebook and a pre-acquired first rank indicator, the first rotation matrix is obtained according to a first channel information, the second channel information is the same as the first channel information, and the second differential codebook and the second rank indicator are the same as the first differential codebook and the first rank indicator respectively; and a precoding matrix reconstructing module, configured to reconstruct the beam forming matrix/precoding matrix according to the second rotation matrix obtained by the rotation matrix obtaining module and the differential matrix obtained by the differential matrix obtaining module.

\* \* \* \* \*